J. H. STIMPSON.
Soldering-Iron Heater.
No. 83,104. Patented Oct. 13, 1868.
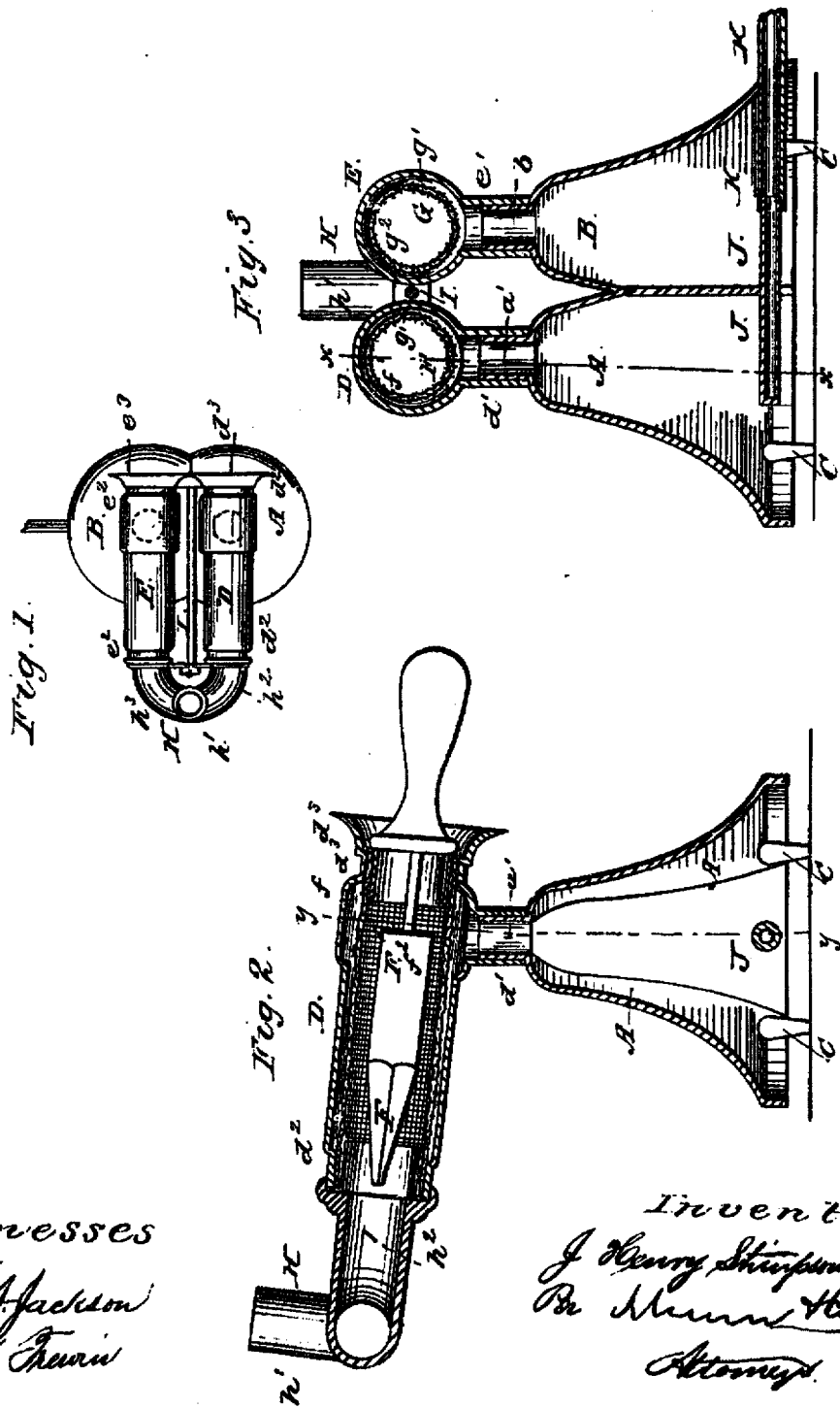

J. HENRY STIMPSON, OF BOSTON, MASSACHUSETTS.

Letters Patent No. 83,104, dated October 13, 1868.

IMPROVED GAS-FURNACE FOR HEATING SOLDERING-TOOLS.

The Schedule referred to in these Letters Patent and making part of the same.

*To all whom it may concern:*

Be it known that I, J. HENRY STIMPSON, of Boston, Suffolk county, and State of Massachusetts, have invented a new and useful Improvement in Gas-Furnace for Heating Soldering-Tools; and I do hereby declare that the following is a full, clear, and exact description thereof, which will enable others skilled in the art to make and use the same, reference being had to the accompanying drawing, forming part of this specification, in which—

Figure 1 is a top or plan view of my improved furnace.

Figure 2 is a vertical longitudinal section of the same, taken through the line $x\ x$, fig. 3.

Figure 3 is a vertical cross-section of the same, taken through the line $y\ y$, fig. 2.

Similar letters of reference indicate like parts.

My invention has for its object to improve the construction of my gas-furnace for heating soldering-tools, patented May 12, 1857.

And it consists in the combination of the two inclined cylinders, open at both ends, with the interior-perforated cylinders, and with the cone-shaped gas and air-chambers, as hereinafter more fully described.

A and B are the cone-shaped gas and air-chambers, which are supported upon feet, C, so that the lower edge of the side and division-walls of said chambers may be sufficiently raised to allow the air to pass freely into them, around their lower edges. The upper ends of the cone-shaped chambers terminate in short tubes, $a^1$ and $b^1$, as shown in figs. 2 and 3.

D and E are cylinders, which are made with short tubes, $d^1$ and $e^1$, on their lower sides, near their lower ends, which open into the said cylinders, and fit upon the short tubes, $a^1$ and $b^1$, of the chambers A and B, as shown in fig. 2.

Around the front and rear ends of the cylinders D and E are formed inwardly-projecting rings or ridges, $d^2$ and $e^2$, to which the ends of the interior-perforated cylinders F and G are closely attached, so as to allow the mixed gas and air to circulate freely around the said cylinders F and G, but be unable to escape otherwise than by passing through the meshes of said cylinders.

The cylinders D and E, and the pipes $d^1$ and $e^1$, are so cast that the said cylinders, when attached to the air and gas-chambers A and B, may stand in a slightly-inclined position, to increase the draught through them, and thus promote the combustion.

To the lower end of the cylinders D and E may be attached mouth-pieces, $d^3$ and $e^3$, which serve as guides in placing the soldering-tools in the cylinders, and which, by being cast in one piece, as shown in fig. 1, also serve to keep the said cylinders in their proper relative positions.

The burnt gases may be conducted away by a flue-pipe, which, for convenience, may be connected to the upper ends of the cylinders D and E, by a branched connection, H, to the part $h^1$, of which the flue-pipe is connected, and the parts $h^2$ and $h^3$ of which are connected to the upper ends of cylinders, D and E, as shown in figs. 1 and 2.

I is a rod, one end of which is attached to the mouth-pieces $d^3$ and $e^3$, and the other to the connection H, and which holds the said parts securely in position upon the cylinders D and E, as shown in fig. 1.

The interior perforated cylinders F and G are double, as shown in figs. 2 and 3, the meshes of the outer parts, $f^1$ and $g^1$, being so fine that the flame cannot pass through them, while the interior parts, $f^2$ and $g^2$, are heavier and stronger, and have coarser meshes, being intended principally to protect the finer parts, $f$ and $g$, from being injured by the soldering-tools.

J is a piece of gas-pipe passing through and secured to the division-wall of the gas and air-chambers A and B. One end of this pipe is closed, and to the other end is attached the end of the flexible tube K, by which the gas is conducted from an ordinary gas-burner to the apparatus. Upon the upper side of the pipe J are formed holes, as shown in fig. 3, through which the gas escapes into the chambers A and B, where it becomes mixed with air. Thence it passes into the cylinders D and E, and is burnt as it escapes through the meshes of the perforated cylinders F and G, surrounding the soldering-tools with a sheet of flame, heating them quickly, and with a comparatively small amount of gas.

I claim as new, and desire to secure by Letters Patent—

The gas-furnace for heating soldering tools, consisting of the double cones A B, supporting the inclined cylinders D E, containing the perforated cylinders F G, composed each of two parts, $f^1\ f^2,\ g^1\ g^2$. Said cylinders D E, connected at their rear ends by the mouth-pieces $d^3\ e^3$, and at their forward ends by the curved pipes $h^2\ h^3$, all arranged and operating as described for the purpose specified.

J. HENRY STIMPSON.

Witnesses:
FRANS. C. HUSEY,
OLIVER FERNALD.